United States Patent [19]
Wyman

[11] Patent Number: 5,195,627
[45] Date of Patent: Mar. 23, 1993

[54] PATTERN-FORMING METHOD APPARATUS FOR CONTAINER PALLETIZING

[75] Inventor: Ronald E. Wyman, Forest Lake, Minn.

[73] Assignee: Wyard Industries, Inc., Forest Lake, Minn.

[21] Appl. No.: 844,122

[22] Filed: Mar. 2, 1992

Related U.S. Application Data

[62] Division of Ser. No. 485,142, Feb. 26, 1990, Pat. No. 5,092,447.

[51] Int. Cl.$^5$ ............................................. B65G 47/24
[52] U.S. Cl. .................................... 198/374; 198/415
[58] Field of Search ............... 198/374, 415, 367, 442; 414/791.6, 792, 792.5, 902

[56] References Cited

U.S. PATENT DOCUMENTS

| | | | |
|---|---|---|---|
| 1,741,616 | 12/1929 | Crady | 198/369 |
| 2,334,384 | 11/1943 | Cohen | 198/369 |
| 2,971,659 | 2/1961 | Miller | 198/374 |
| 3,126,086 | 3/1964 | Holben | 198/442 |
| 3,139,965 | 7/1964 | Eggert | 198/374 |
| 3,294,257 | 12/1966 | Davies et al. | 414/792 |
| 3,420,385 | 1/1969 | Verrinder | 198/374 |
| 3,599,789 | 8/1971 | Kurczak | 198/367 |
| 3,917,082 | 11/1975 | Howard et al. | 414/796.4 |
| 3,954,190 | 5/1976 | Howard et al. | 414/794.3 |
| 4,026,422 | 5/1977 | Leenaards | 198/374 |
| 4,173,274 | 11/1979 | Kantarian et al. | 198/367 |
| 4,643,291 | 2/1987 | Counter et al. | 198/367 |
| 4,676,361 | 6/1987 | Heisler | 198/415 |
| 4,807,739 | 2/1989 | Wolf et al. | 198/415 |
| 5,092,447 | 3/1992 | Wyman | 198/374 |

*Primary Examiner*—Joseph E. Valenza
*Attorney, Agent, or Firm*—Moore & Hansen

[57] ABSTRACT

Apparatus and method for arranging cartons or cases of beverages in predetermined patterns in a conveying process for stacking in tiers on pallets. A combination of an input guide conveyor moveable between left, right, and centered positions and at least one moveably adjustable diverter bar is utilized to direct incoming containers along a predetermined path through a pattern-forming zone comprised of a plurality of parallel, power-driven conveyors. Containers are directed one at a time either along a dividing line path between two, adjacent, pattern-forming conveyors in overlapping relation thereto, or directly onto one of those conveyors. A differential speed-control mechanism is provided in conjunction with one or more of the parallel, pattern-forming conveyors and is selectively actuated to change the speed of one conveyor of a pair of conveyors on which a container is being carried in overlapping relation to both conveyors. Such a conveyor speed change causes the container to be turned sideways and is utilized to orient containers in desired, alternate tier patterns for stacking on pallets.

5 Claims, 4 Drawing Sheets

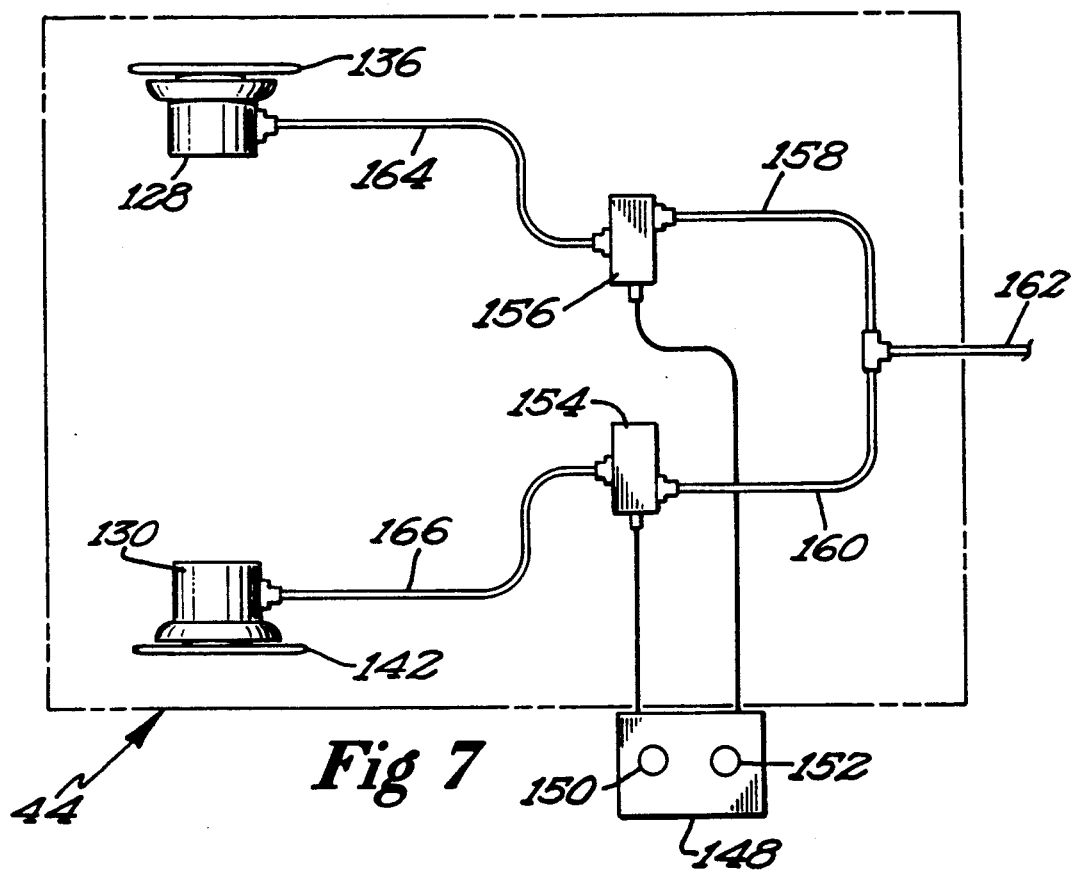

PATTERN-FORMING METHOD APPARATUS FOR CONTAINER PALLETIZING

This is a division of application Ser. No. 07/485,142, filed Feb. 26, 1990, now U.S. Pat. No. 5,092,447.

BACKGROUND OF THE INVENTION

This invention relates generally to the field of material handling, and in particular to improved material-handling conveyor apparatus for automatically arranging containers of beverages, such as cartons of soft drinks or beer, in predetermined patterns, sequentially, for reception and stacking on pallets.

As is well known in the art, the pattern in which containers are arranged in sequential tiers on stacks of pallets must be alternated in order that the stack of pallets will be stable and not have a propensity to tip over. It is known in the prior art to utilize various types of diverting and guiding devices to direct alternate container packages sequentially down one of a plurality of parallel conveyor lines leading to a pattern-forming area for the containers prior to their movement onto pallets. Also, the use of star-type turning devices, bumper bars, and diverters of various types for turning or rotating containers to a desired orientation as they are being conveyed through a pattern-forming area is well known. See, for example, U.S. Pat. No. 3,954,190, for a disclosure of star type turning device.

In the course of depalletizing containers from pallets on which the containers are oriented in different directions, differential speed control on conveyors utilized to receive the containers from the pallets has been utilized to uniformly orient the containers for receipt onto a discharge conveyor in a single row. U.S. Pat. No. 3,917,082 discloses a destacking and depalletizing apparatus wherein adjacent conveyor devices running at different speeds receive containers in overlapping relation to the two conveyors and rotate the containers to the desired orientation. However, there is no disclosure in that patent of selectively and intermittently adjusting the speed of adjacent conveyors so as to selectively rotate containers to a desired orientation in the process of sequentially forming groups of containers into different patterns for palletizing purposes.

The turning devices of the aforesaid type known and used in the prior art for orienting containers in desired patterns suffer from the disadvantage that the movement of containers is slowed down in the pattern-forming process in order to avoid interference with the next following container as a preceding container is rotated and delayed by a turning device. There thus exists a need for a high-speed, container pattern-forming, conveying system which can be automatically controlled in such a way as to form alternate patterns of containers for palletizing and stacking in tiers without unduly reducing the speed of the pattern-forming process in the conveying apparatus. The conveying apparatus disclosed herein has been particularly designed to meet that need in an effective and efficient way.

BRIEF SUMMARY OF THE INVENTION

The container-handling method and apparatus of this invention is particularly characterized by the selective and intermittent use of differential speed control on parallel conveyors in such a way as to permit the arrangement of sequentially-conveyed containers in desired orientations as groups of containers are formed into different patterns for palletizing and stacking. The apparatus is adaptable to any type of containers. Application to the palletizing of cartons or cases of beverages, such as soft drinks and beer, is particularly anticipated, and the term "container" as used herein is intended to encompass such types of container packages.

A primary objective is to receive containers one at a time from an in-feed conveyor and to form the containers into desired patterns for reception in a collection area and ultimate stacking on pallets, in a high-speed operation wherein there is no delay in the container-handling process due to the turning or rotating of the containers to orient them in predetermined patterns.

This basic objective is realized by providing a plurality of parallel, pattern-forming conveyors in a pattern-forming zone or area, with an adjustable speed-control drive arrangement connected to at least one of an adjacent pair of pattern-forming conveyors. Input guide-conveying devices are arranged and utilized to direct containers one at a time along a dividing-line path between the two adjacent conveyors in overlapping relation thereto. The speed control mechanism may then be selectively utilized to change the speed of one of the adjacent conveyors. This has the effect of advancing one side of the container straddling the two conveyors at a different rate than the other side thereof, with the result that the container is turned or rotated to a desired orientation.

As a particularly advantageous feature, the speed-controlled conveyor is accelerated so as to advance the container at a greater than normal linear rate as it is turned. Interference with following containers is thus avoided, and maximum speed of the conveyor-handling process is achieved.

In the preferred embodiment, incoming containers of generally rectangular shape are oriented longitudinally with respect to their direction of movement and are guided or diverted to the dividing or separating line between a preselected pair of adjacent, pattern-forming conveyors, one of which is speed controlled. The containers are preferably centered on the dividing line path between the two conveyors so that the container rotates about its own axis in a turning motion as the speed of one of the conveyors is selectively changed.

Effective and efficient pattern-forming of containers is realized by utilizing input guide conveyors, preferably of the roller type, moveable between centered, left and right positions with respect to the pattern-forming conveyors and the direction of container travel, in combination with at least one moveable diverter bar to selectively guide incoming containers, one at a time, through the aforesaid pattern-forming zone. The diverter bar is positioned between the input guide conveyors and the pattern-forming conveyors and is moveable between a first position wherein it directs containers directly onto one of the parallel, pattern-forming conveyors and a second position in which it directs containers along a dividing line path between two adjacent pattern-forming conveyors in overlapping relation thereto. One of the two adjacent pattern-forming conveyors has speed-control means mechanically associated therewith to permit turning containers to a desired orientation by selectively adjusting the conveyor speed.

These and other objects and advantages of the invention will become readily apparent as the following description is read in conjunction with the accompanying drawings wherein like reference numerals have been

BRIEF DESCRIPTION OF THE DRAWINGS

FIG. 7 is a diagrammatic view showing the control arrangement for adjusting the speed of selected, adjacent pallet-forming conveyors.

DESCRIPTION OF THE PREFERRED EMBODIMENT

Figure 1:
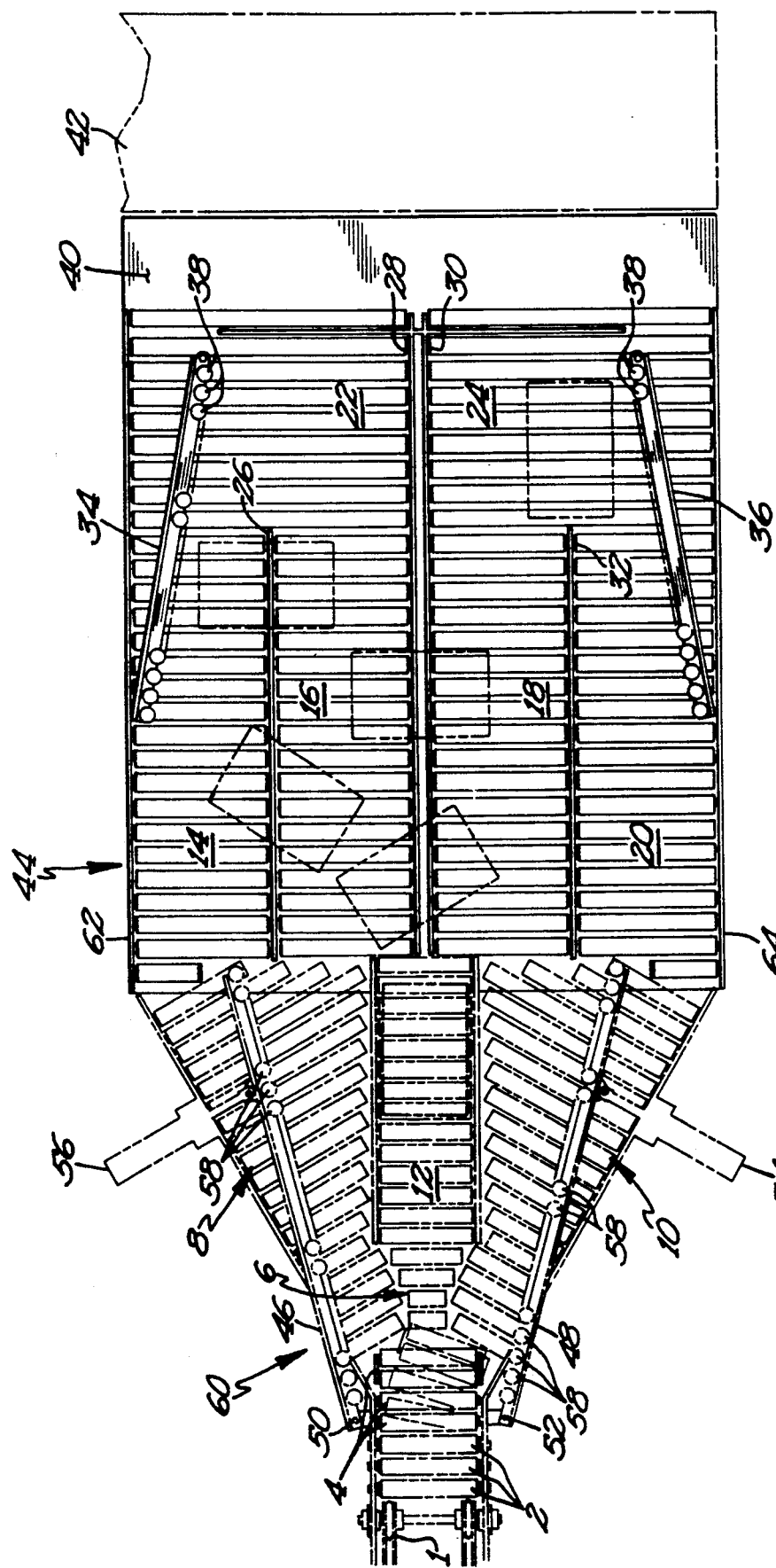
FIG. 1 is a top, plan view of the pattern-forming conveyor apparatus of this invention.

With reference now to the drawings, and particularly to FIG. 1, the container pattern-forming, conveyor apparatus of this invention is shown and utilized in conjunction with an infeed conveyor 1 which may preferably take the form of a chain conveyor on which containers are delivered one at a time from a container packaging operation. In such an operation, bottles or cans of soft drinks or beer are packaged into cartons or cases, such as the well known six-pack or twelve-packs of bottles of soft drinks. Such cartons and cases of bottled beverages ordinarily are of rectangular shape, and are received from infeed conveyor 1 oriented longitudinally, that is, with the longitudinal axis of the rectangular carton extending parallel to the direction of conveyor and container movement. The containerized packages of beverages may be cartons or cases, and are generally referred to herein as "containers."

Incoming containers are delivered from infeed conveyor 1 onto conveyor rollers 2, from which the containers move one at a time onto input guide conveyor means, preferably comprising a plurality of guide rollers 4. Input guide conveyor rollers 4 are selectively moveable in a horizontal plane between left, right, and a straight or centered position for guiding containers one at a time onto one of a plurality of receiving rollers 6, 8, and 10. Receiving rollers 6 actually form a continuation of the path of straight, receiving rollers 12 aligned therewith, with receiving rollers 8 and 10 being angled to the left and right respectively as viewed in FIG. 1. When in the straight position as shown in solid lines in FIG. 1, input guide rollers 4 are centered on and aligned with straight receiving rollers 6, 12. Input guide rollers which are moveable between straight, left and right positions to alternately direct incoming cartons or cases of beverage containers down different receiving conveyor lanes are well known in the art, as are various mechanical means for selectively moving such guide rollers between different positions. Such mechanical-actuating means for shifting the guide rollers 4 between various positions of adjustment may comprise, for example, a pivotal yoke lever arrangement actuated by a power cylinder and secured to the underside of each of the guide rollers 4. Such mechanical-actuating means for rotating rollers 4 between different positions are known and believed to be readily understood by those in the art, and are therefore not shown in the drawings. Rollers 4 are shown in their straight or centered positions in solid lines in FIG. 1, and are shifted to the right as shown in phantom lines. Although a three-position guide roller arrangement has been shown and described, the guide rollers could be shifted between any number of positions, depending upon the number of conveyor lane options desired.

At the discharge end of receiving rollers 8-12 are a plurality of parallel, side-by-side, pattern-forming conveyors 14, 16, 18, and 20. Downstream from pattern-forming conveyors 14-20, with respect to the direction of container movement, are a pair of discharge rollers 22 and 24. The split or dividing line between pattern-forming rollers 14, 16, 18, and 20 is defined by separator bars or strips 26, 28, 30, and 32, respectively. The centerline between separator bars 28 and 30 defines the dividing line path between roller conveyors 16 and 18. Inwardly angled guide bars 34 and 36 having idler disks 38 thereon in a known guide bar arrangement serve to funnel successive containers across discharge rollers 22, 24 and onto a receiving apron or transfer plate 40. A pusher bar mechanism, not shown, may be utilized to push groups of containers from transfer plate 40 onto pallets in a stacking chamber 42, with each group of pallets being formed into a desired pattern. The stacking chamber 42 may comprise an elevator or lift onto which pallets are moved to receive successive tiers of pallet groups, alternately patterned as desired. Such a palletizing and lift arrangement for receiving tiers of containers formed in desired patterns is disclosed in U.S. Pat. No. 3,954,190, the disclosure of which is incorporated herein by reference. In such a palletizing machine, the conveying apparatus for receiving, directing, and pattern-forming of containers as described above would be located at an elevated level, with each pallet load of a stack of tiered container patterns being lowered in the elevator for subsequent conveyance to a storage area.

The group of pattern-forming conveyors 14-20, together with guide bars 34 and 36 comprise a pattern-forming zone for containers generally designated by reference numeral 44. Container-receiving conveyors 6, 8, 10, and 12 are located between input, guide rollers 4 and pattern-forming conveyors 14-20 in a container-guiding and diverting zone generally indicated by reference numeral 60. That zone also preferably includes diverter bars 46 and 48 which extend generally along the direction of container travel and are angled slightly outwardly from their pivot point mounts 50 and 52. Diverter bars 46 and 48 also have idler disks 58 mounted thereon for the rolling and guiding control of containers directed onto receiving rollers 8, 10, and 12 by input guide rollers 4. Hydraulic cylinders 54 and 56 connected to diverter bars 46 and 48 are selectively actuated to move the diverter bars between a first, outwardly pivoted position, and a second, inwardly-moved position in which the diverter bars are shown in FIG. 1. In their outwardly-pivoted positions, diverter bars 46 and 48 will be angled to generally intersect the outer edges of laterally outwardly disposed pattern-forming conveyors 14 and 20 so as to direct containers one at a time directly onto those conveyors. In their inwardly-disposed positions shown in FIG. 1, diverter bars 46 and 48 serve to direct containers from receiving conveyors 8 and 10 along the dividing line paths 26 and 32 between pattern-forming conveyors 14, 16 and 18, 20, respectively. Thus, guiding and diverting zone 60 is comprised of input guide rollers 4, receiving rollers 6-12 and diverter bars 46 and 48.

Pattern-forming rollers 14, 16, 18 and 20 are power driven. Those rollers are supported in a conventional manner between roller mounting bars or plates, four of which have been identified as separator bars or strips 26, 28, 30, and 32. Outer roller-mounting plates 62 and 64 serve to rotatably support the outer ends of rollers 14 and 20. Each of the rollers 14, 16, 18, and 20 has stub spindle extensions (not shown) at its opposite ends which are rotatably supported in opposed pairs of laterally spaced separator bars and mounting plates 62–26, 26–28, 30–32, and 32–64.

In order to provide adjustable, differential speed control on selective ones of the pattern-forming conveyors 14, 16, 18, and 20, a special power drive arrangement is provided. That power drive mechanism is preferably located under roller conveyors 14–20, and is shown in plan view in FIG. 2.

Figure 2:
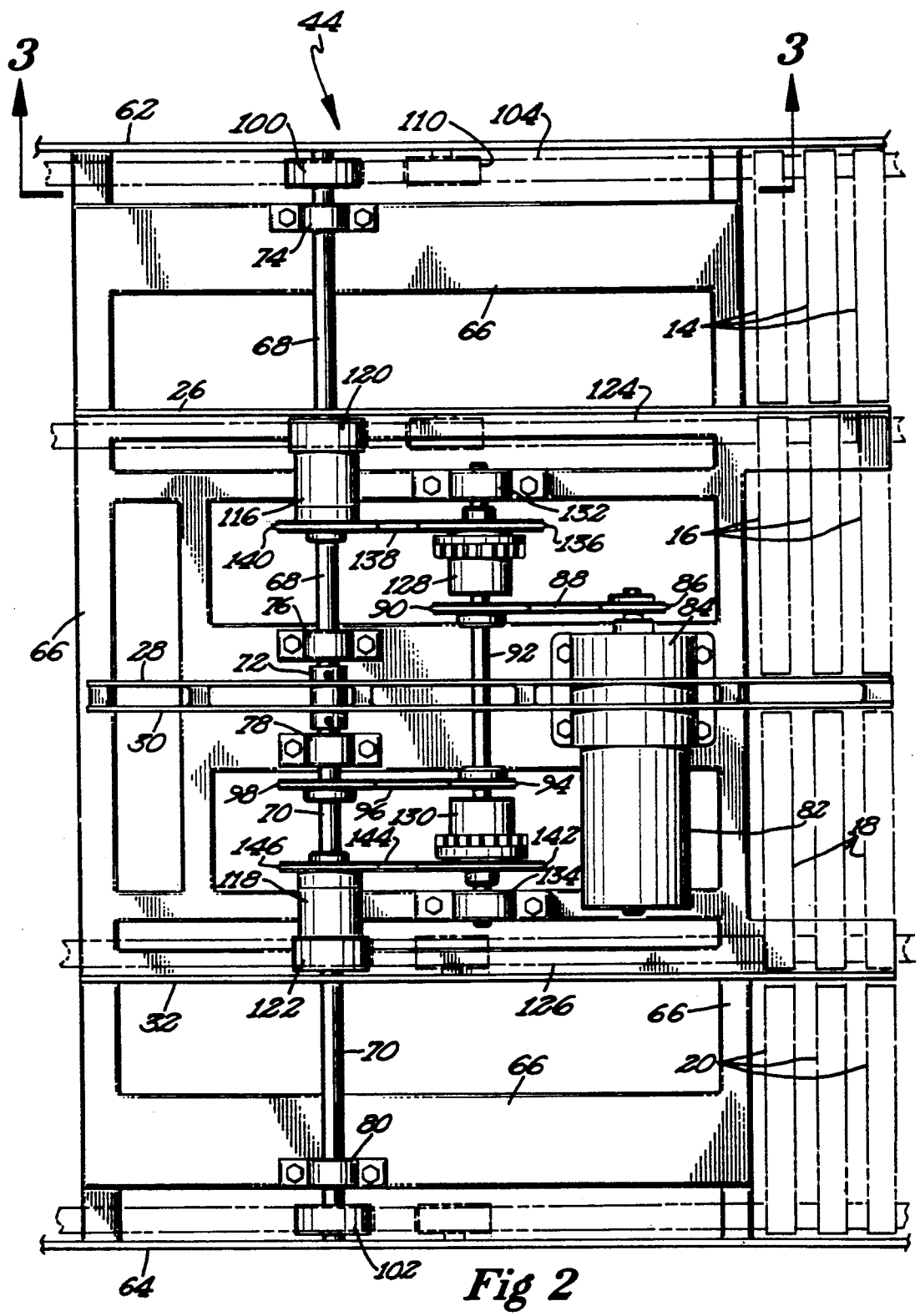
FIG. 2 is a top, plan view of a portion of the apparatus of FIG. 1 showing the conveyor drive and speed-control mechanism.

As shown in FIG. 2, the drive arrangement is supported on a frame plate 66, on which the roller separator and mounting plates 26, 28, 30, 32, 62, and 64 are also mounted. A split drive shaft comprised of two drive shaft segments 68 and 70 coupled in the center of frame 66 at coupling 72 provides driving power to the two outer roller conveyors 14 and 20, the four pattern-forming roller conveyors 14–20 being partially shown in phantom lines in FIG. 2. Drive shaft segment 68 is supported between pillow-block bearings 74 and 76, and drive shaft segment 70 is supported in like manner between pillow-block bearings 78 and 80. Drive shaft segments 68 and 70 operate as one continuous drive shaft which receives its rotary power from a motor 82 having a gear reducer 84 at its output end. Power from motor 82 is delivered at the output side of gear reducer 84 through a sprocket 86 to a second sprocket 90 by way of a drive chain 88. Sprocket 90 is mounted on a power shaft 92 having a second sprocket 94 mounted at its opposite end. A second drive chain 96 delivers power from sprocket 94 to a sprocket 98 mounted on drive shaft segment 70. In this manner drive shaft segments 70 and 68 are driven at a first, standard speed from motor 82. Power is delivered from drive shaft segment 68 and 70 through pulleys 100 and 102 mounted on their opposite ends as shown in FIG. 2.

Figure 3:
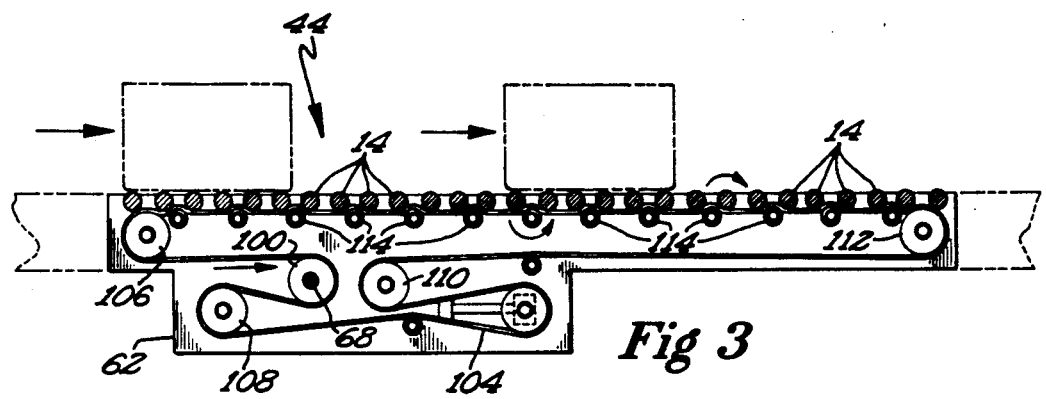
FIG. 3 is a vertical section view taken along lines 3—3 of FIG. 2 further illustrating the conveyor drive arrangement.

The drive from belt pulleys 100 and 102 to outer roller conveyors 14 and 20 is identical, and is described herein with respect to the belt drive arrangement for roller conveyor 14 as shown in FIGS. 2 and 3. As particularly may be noted with respect to FIG. 3, pulley 100 drives a belt 104 which is guided around a plurality of idler pulleys 106, 108, 110, and 112. The upper segment of drive belt 104 is trained over a plurality of idler rollers 114 which are horizontally spaced between adjacent pairs of conveyor rollers 14. In this manner, idler rollers 114 force belt 104 upwardly between adjacent rollers 14 in tight, driving engagement therewith so as to thereby provide driving power to rollers 14. FIG. 3 shows in phantom line two containers being conveyed on roller conveyor 14, with the containers oriented in the normal manner, lengthwise of the conveyor apparatus, as they are received from infeed conveyor 1.

The two inner roller conveyors 16 and 18 are driven from the outer housings of cam clutches 116 and 118 mounted on drive shaft segments 68 and 70 respectively. Pulleys 120 and 122 are mounted on the outer ends of cam clutches 116 and 118 as shown. These pulleys serve to drive belts 124 and 126 respectively, through which driving power is provided to the two inner roller conveyors 16 and 18 of the pattern-forming conveyor system in the same manner as described above with respect to conveyor 14. Cam clutches 116 and 118 are of conventional design and are commercially available. Such clutches are overrunning clutches and are keyed to shaft segments 68 and 70 in such a way that those shafts also provide driving power to the rotary housings of cam clutches 116 and 118. Thus, at the standard conveyor drive speed delivered from drive motor 82 through drive shaft segments 68 and 70, inner roller conveyors 16 and 18 will be driven at the same speed as outer roller conveyors 14 and 20.

Because of the overriding drive construction of cam clutches 116 and 118, their housings can also be rotated at a higher speed than shaft segments 68 and 70 in overriding relation thereto so as to permit the selective driving of inner roller conveyors 16 and 18 at higher speeds than the standard drive speed. For this purpose, an auxiliary drive arrangement utilizing a pair of air clutches 128 and 130 are provided on the opposite ends of power shaft 92, inwardly from pillow block bearings 132 and 134 between which that shaft is rotatably supported. Such air clutches are commercially available; those manufactured by Horton Manufacturing Co., Inc. of Minneapolis, Minn., have proven to be suitable. Air clutch 128 has a sprocket 136 mounted on its output end, and a chain 138 transmits power from sprocket 136 to a smaller sprocket 140 mounted on the housing of cam clutch 116. In a similar manner, a sprocket 142 is mounted on the output end of the air clutch 130 and is drivingly coupled to a sprocket 146 on cam clutch 118 by means of a drive chain 144. Although any desired speed ratio may be established through the sprocket pairs 136, 140 and 142, 146 in order to adjust the speed of the two inner conveyors 16 and 18, it has been found desirable to increase the speed of those conveyors as required for turning containers being transported through the pattern-forming section 44. A speed increase ratio of two to one with respect to the normal drive speed of shaft segments 68 and 70 has been accomplished by sizing drive sprockets 136 and 142 so as to have twice as many teeth as the smaller driven sprockets 140 and 146. By selectively increasing the speed of one of the pattern-forming conveyors, the turning of a container can be accomplished without interfering with other containers moving through the pattern-forming zone 44.

FIG. 7 illustrates schematically the electrical control arrangement utilized to selectively actuate one or both of the air clutches 128 and 130, and thus to change the speed of pattern-forming conveyors 16 and 18 in a predetermined manner so as to rotate or turn selected containers in a pattern-forming process. An electrical controller 148 having a pair of control knobs 150 and 152 is connected in a power supply circuit to a pair of solenoid valves 154 and 156. Solenoid valves 154 and 156 are connected in branch air lines 158 and 160 of a main air supply line 162 through which a source of pressurized air is delivered for actuation of air clutches 128 and 130. The two solenoid valves are connected by branch supply line 164 and 166 to air clutches 128 and 130, respectively. Thus, control knob 150 is used to control the speed of conveyor 18 through selective actuation of air clutch 130; and control knob 152 is utilized to control the actuation of air clutch 128 so as to regulate the speed of roller conveyor 16. Control knobs 150 and 152 will each have a standard speed and a high speed position. When adjusted to the standard speed positions, solenoid valves 154 and 156 will be closed so as to block the flow of pressurized air to the air clutches 128 and 130. This will be the normal setting of controller 148, with air clutches 128 and 130 normally deactivated. As a result, there will be no driving power through sprockets 136 and 142, and the outer housings of cam clutches 116 and 118 will rotate at the same, normal speed as are pulleys 100 and 102, as driven by shaft segments 68 and 70. Thus, under such normal or standard drive conditions, all four conveyors 14, 16, 18, and 20 will be driven at the same speed. When it is desired to increase the speed of either or both of conveyors 16 and 18, control knobs 150 and 152 are set to their second or high speed positions. This causes solenoid valves 154 and 156 to open so as to supply pressurized air to cam clutches 128 and 130. This serves to actuate the cam clutches, whereby they transmit driving power from power shaft 92 to sprockets 136 and 142, respectively. With driven sprockets 140 and/or 146 operating at a higher speed, the housings of cam clutches 116 and 118 will also operate at the same predetermined higher rotary speed in revolving relation to drive shaft segments 68 and 70 so as to increase the speed of drive belts 124 and/or 126, and thus of roller conveyors 16 and 18. As stated above, drive belts 124 and 126 supply driving power to conveyors 16 and 18 through a belt-drive arrangement which is the same as that described above for belt 104 with respect to roller conveyor 14.

In operation, containers are received one at a time from in-feed conveyor 1, from which they move across fixed rollers 3 onto input guide rollers 4. Input guide rollers 4 are preferably power driven in order to provide a continuing impetus to the containers onto receiving rollers 6, 8, 10, and 12. The containers, normally of an elongated rectangular shape in the form of cartons, cases, or boxes, will initially be oriented longitudinally with respect to the direction of container and conveyor movement, as is illustrated with respect to the container moving along roller conveyor 12, as well as on conveyor 14 as shown in FIG. 3. Moveable input guide rollers 4 and diverter bars 46 and 48 are selectively utilized to initially direct containers either along one of the splits or dividing lines 26, 28, and 32 between adjacent pattern-forming conveyors 14, 16, 18, and 20, or directly onto one of the laterally outermost containers 14 and 20. Through the controlled actuation of input guide rollers 4, incoming cases can be initially directed either straight ahead onto receiving rollers 12, or directed to the left onto receiving rollers 8, or to the right onto receiving rollers 10. With rollers 4 turned to the right as shown in phantom lines in FIG. 1, incoming containers will be directed onto receiving rollers 10. The patterns of containers are alternated so that each group or tier of containers will be in a predetermined, different pattern than the preceding tier in order to provide stability on a stack of container tiers received on a single pallet in stacking chamber 42. FIGS. 4, 4a, 5, 5a, 6, and 6a illustrate some of the variety of container-package patterns which can be formed by selective control of input guide rollers 4, diverter bars 46, 48, and of the speed of pattern-forming, roller conveyors 16 and 18.

Diverter bars 46 and 48 are normally moved by air-actuated power cylinders 54 and 56 to their fully, outwardly-angled positions wherein their free ends will be substantially in alignment with outer roller mounting plates 62 and 64. With diverter bars 46 and 48 in such positions, containers directed by guide rollers 4 along receiving rollers 8 and 10 will be directed straight onto outermost pattern-forming conveyors 14 and 20. With diverter bars 46 and 48 selectively moved inwardly to the positions shown in FIG. 1, they will divert incoming containers from receiving rollers 8 and 10 along dividing line paths or splits 26 and 32, with the containers preferably centered longitudinally thereon. Thus, by selectively speeding up either one of the inner, pattern-forming roller conveyors 16 and/or 18, containers moving along dividing line paths 26 and 32 can be turned or rotated. The duration of accelerated speed of one of the inner pattern-forming conveyors 16 or 18 is established so that containers will be rotated approximately 90°, and thus turn sideways, as indicated in FIG. 1 with respect to a container moving along dividing line path 26. With input guide rollers 4 moved to their straight ahead or centered position as shown in solid lines in FIG. 1, they will direct containers one at a time onto receiving rollers 12, from which the containers will move along the centerline or dividing-line path between inner, pattern-forming conveyors 16 and 18 in overlapping relation thereto. That dividing-line path is defined by the centerline between separator bars or strips 28 and 30. In like manner, the containers directed to the left or to the right by input guide rollers 4 will be centered on the dividing lines defined by separator bars or strips 26 and 32, in overlapping relation to conveyors 14, 16, and 18, 20, respectively, when diverter bars 46 and 48 are in their inwardly moved positions as shown in FIG. 1. The turning or rotating of containers sideways to a position wherein containers in the form of elongated cartons or cases extend generally perpendicular to the direction of container travel is selectively controlled, in a predetermined sequence, by the operation of controller 148 and its control knobs 150 and 152 as described above with respect to FIG. 7. This may be done manually by an operator, or a computer programmed to regulate the movement of input guide rollers 4, diverter bars 4, and speed controller 48 may be utilized in conjunction therewith to automatically direct containers onto predetermined pattern-forming roller conveyors 14–20 and to selectively rotate them as desired to form groups of containers in alternate, desired patterns for reception as tiers on a pallet in stacking chamber 42. It will be understood, for example, that with a container centered on the dividing line between inner conveyors 16 and 18, the speeding up of pattern-forming conveyor 18 will cause the right side of such a container to move forward at a faster linear rate than the left side thereof, as viewed in FIG. 1, thus causing the container to rotate about its own axis 90° to the position shown in phantom lines in FIG. 1. Such a container turning movement is accomplished by moving control knob 150 to its high speed position so as to actuate air clutch 130, and thus to accelerate drive belt 126 for conveyor 18. The same type of turning movement may be accomplished for containers moving down dividing-line paths 32 and 26 in overlapping relation to roller conveyors 14, 16, or 18, 20, by selective actuation of air clutches 128 and 130, through the use of control knobs 150 and 152.

As noted above, controller 148 may be computer-controlled and programmed to automatically change conveyor speeds in a predetermined sequence in order to form a desired series of patterns in a particular production run.

Figure 4:
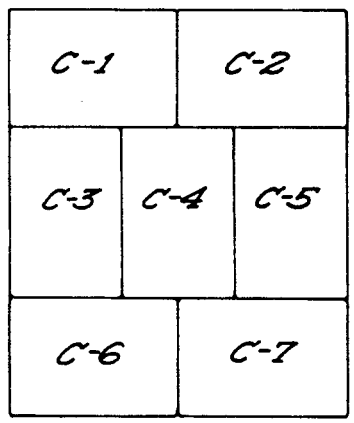
FIGS. 4, 4a, 5, 5a, 6, and 6a are schematic illustrations of different types of patterns into which containers may be formed for palletizing.
Figure 4A:
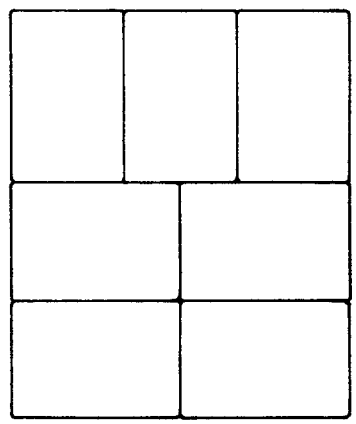
Figure 5:
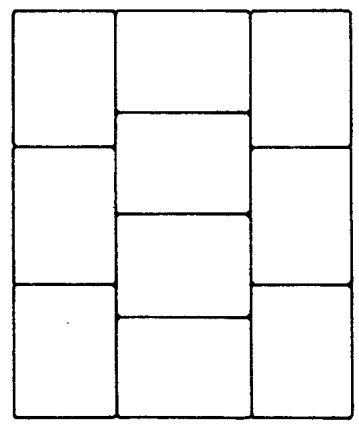
Figure 5A:
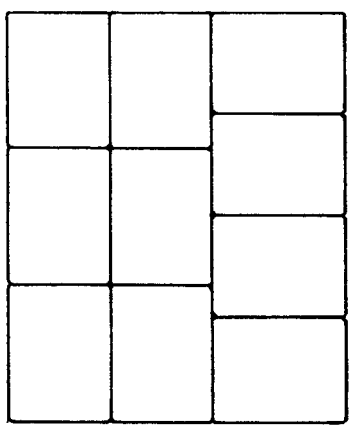
Figure 6:
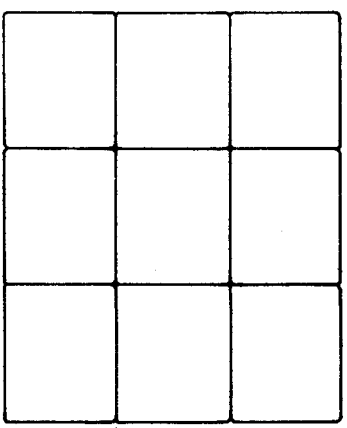
Figure 6A:
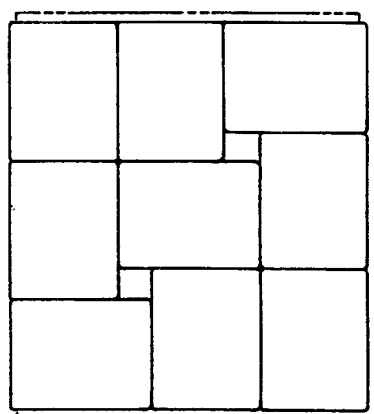

With respect to the tier pattern illustrated, by way of example, in FIG. 4, input guide rollers 4 would be sequentially moved left and right to direct containers C-1 and C-2 along receiving rollers 8 and containers C-6 and C-7 along received rollers 10. The three containers C-3, C-4, and C-5 would be directed straight ahead by input guide rollers 4 onto receiving rollers 12, and thereafter along the dividing line path between inner pattern-forming conveyors 16 and 18. Those three containers would be turned to the positions shown in FIG. 4 by selective acceleration of either one of the inner conveyors 16 or 18.

It is anticipated that various changes may be made in the construction and operation of the conveyor and container pattern-forming apparatus of this invention without departing from the spirit and scope of the invention as defined by the following claims.

What is claimed is:

1. A method of forming containers into desired patterns in a conveyor system having an infeed conveyor, movable between straight, left and right positions with respect to the direction of container infeed movement for reception in a collection area and stacking on pallets, comprising:

directing a predetermined number of containers one at a time from said infeed conveyor onto one of at least three parallel, pattern-forming conveyors, with each of said containers being initially received onto one of said pattern-forming conveyors in a first orientation with respect to the direction of conveyor movement;

intermittently positioning the infeed conveyor in a selected left, right or straight orientation to direct a preselected container along a path between two adjacent pattern-forming conveyors such that the container overlaps and is carried by said two adjacent conveyors, at least one of said two adjacent conveyors having selectively adjustable speed control means mechanically associated therewith;

selectively changing the speed of said one of said two adjacent conveyors to thereby cause one side of said preselected container to advance at a different linear rate than the other side thereof, whereby said preselected container is caused to rotate to a predetermined, second orientation with respect to the direction of conveyor movement; and discharging said predetermined number of containers in a predetermined pattern from said plurality of pattern-forming conveyors into said collection area for reception onto a pallet.

2. The container pattern-forming method of claim 1 wherein:

said containers are oriented generally parallel to said direction of conveyor movement in said first orientation and said selective speed change is so controlled as to rotate said preselected container substantially ninety degrees so as to be positioned generally normal to the direction of conveyor movement.

3. The container forming method of claim 1 wherein:

the speed of said one of said two adjacent conveyors is increased to thereby accelerate the movement of said preselected container as it is rotated to said second orientation.

4. The container pattern-forming method of claim 1 wherein:

said path along which a preselected container is directed is along the dividing line between said two adjacent conveyors, with said preselected container being so directed intermittently as to be centered on said dividing line.

5. The container pattern-forming method of claim 1 wherein:

said conveyor system includes selectively actuable diverter bar means located between the delivery end of said infeed conveyor and said pattern-forming conveyors in container guiding juxtaposition to intermediate receiving conveyors, said diverter bar means being movable between a first position wherein it directs containers directly onto one of said pattern-forming conveyors and a second position wherein it directs containers along said path between said two adjacent conveyors, and intermittently directing said preselected container along said path between said two adjacent conveyors by moving said diverter bar means to said second position.

* * * * *

UNITED STATES PATENT AND TRADEMARK OFFICE
CERTIFICATE OF CORRECTION

PATENT NO. : 5,195,627
DATED : March 23, 1993
INVENTOR(S) : Ronald E. Wyman

It is certified that error appears in the above-identified patent and that said Letters Patent is hereby corrected as shown below:

On the first page of the patent, please amend the title as follows:

Following PATTERN-FORMING, add CONVEYOR and following "METHOD" delete APPARATUS.

The title should read:

PATTERN-FORMING CONVEYOR METHOD FOR CONTAINER PALLETIZING

Also in Column 1 of the specification, please amend the title as noted above.

Signed and Sealed this

Fourth Day of January, 1994

*Attest:*

BRUCE LEHMAN

*Attesting Officer*     Commissioner of Patents and Trademarks